(12) United States Patent
Belliveau

(10) Patent No.: US 6,545,586 B1
(45) Date of Patent: Apr. 8, 2003

(54) METHOD AND APPARATUS FOR ESTABLISHING AND USING HIERARCHY AMONG REMOTELY CONTROLLABLE THEATRE DEVICES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 09/440,303

(22) Filed: Nov. 17, 1999

(51) Int. Cl.$^7$ .............................................. H03K 17/00
(52) U.S. Cl. ...................... 340/2.1; 340/2.24; 340/2.26; 340/2.4; 315/314; 315/315; 315/317
(58) Field of Search ................................. 340/2.1, 2.24, 340/2.26, 2.4, 2.25; 315/314, 315, 316, 317, 360

(56) References Cited

U.S. PATENT DOCUMENTS

| | | | |
|---|---|---|---|
| 3,579,030 A | | 5/1971 | Bentham |
| 3,706,914 A | | 12/1972 | Van Buren |
| 3,784,875 A | | 1/1974 | Baker et al. |
| 3,898,643 A | | 8/1975 | Ettlinger |
| 4,063,220 A | | 12/1977 | Metcalfe et al. |
| 4,095,139 A | | 6/1978 | Symonds et al. |
| 4,096,355 A | | 6/1978 | Rothauser et al. |
| 4,392,187 A | | 7/1983 | Bornhorst |
| 4,697,227 A | | 9/1987 | Callahan |
| 4,980,806 A | | 12/1990 | Taylor et al. |
| 5,452,435 A | * | 9/1995 | Malouf et al. ............. 395/550 |
| 6,175,201 B1 | | 1/2001 | Sid |

OTHER PUBLICATIONS

Carlson, Steven B., A Guided Tour of DMX512, ROSCOEntertainment Technology, Mar. 25, 1996.
High End Systems, Inc., High End Systems Product Line, 1996.

* cited by examiner

*Primary Examiner*—Julie Lieu
(74) *Attorney, Agent, or Firm*—Dorsey & Whitney LLP

(57) ABSTRACT

A theatre system operating in compliance with the DMX512 protocol is also able to support remote channel assignment of the various theatre devices included therein as well as other auxiliary operating modes by establishing a device hierarchy based on unique ID numbers assigned to the theatre devices when DMX communication is inactive. The theatre devices communicate with each other bi-directionally to establish a device hierarchy. Each theatre device has a pre-assigned unique device identification number, and a hierarchy is established based on these unique ID numbers. One way to establish a hierarchy is to create a list of the unique device identification numbers of the bi-directional theatre devices in the system, and then determine the position of each theatre device on the list. The list may be assembled by one of the bi-directional theatre devices and broadcast to all when completed, or each bi-directional theatre device may itself assemble a complete list. Determining the positions of the theatre devices may be performed by each of the bi-directional theatre device for itself, in which case the bi-directional theatre devices store substantially identical lists and each of them compares its unique ID number to the list to establish its position in the list. Alternatively, one of the bi-directional theatre devices may calculate the respective positions in the list of all of the bi-directional theatre devices, and then communicate the position information for a particular theatre device to that device.

90 Claims, 10 Drawing Sheets

METHOD AND APPARATUS FOR ESTABLISHING AND USING HIERARCHY AMONG REMOTELY CONTROLLABLE THEATRE DEVICES

BACKGROUND OF THE INVENTION

1. Field of the Invention

The present invention relates to digital control of theatre devices, and more particularly to establishing a hierarchy among theatre devices normally remotely controlled by a unidirectional continuous data stream from a central controller and to using a hierarchy, however established, for various purposes such as service and setup, including channel assignment.

2. Description of Related Art

Theatre devices responding to instructions from a remotely located controller are often used for many types of theatre events such as, for example, Broadway shows, television programs, rock concerts, theme parks, the architectural lighting of restaurants and buildings, and other dramatic and entertainment purposes. Theatre devices include multi-parameter lights, haze machines, lighting dimmers, strobes, fans, searchlights, and the like. Typically, theatre devices are wired together with a communications system so that the devices may be operated remotely from a central controller. Some of the theatre effects that can be remotely control including pan, tilt, color, focus, pattern, dimmer, strobe, wind and so forth.

Prior to the advent of relatively small commercial digital controllers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger. With the widespread use of digital computers, digital serial communications has been adopted as a way to achieve remote control; see , e.g., U.S. Pat. No. 4,095,139, issued Jun. 13, 1978 to Symonds et al., and U.S. Pat. No. 4,697,227, issued Sep. 29, 1987 to Callahan.

Proprietary protocol schemes for serial communications with theatre devices developed, which left the user desiring to control theatre devices from different manufacturers with the necessity of having to use an array of different equipment using different protocols designed by the respective manufacturers. In response to this situation, the United States Institute of Theatre Technology ("USITT") in 1986 adopted a standard digital communications system protocol for theatre devices known as DMX512. While the DMX512 protocol has been updated several times since its adoption, the basic communications protocol remains the same. Basically, the DMX512 protocol requires a continuous stream of data at 250 Kbaud which is communicated one-way from the central controller to the theatre devices. Typically, the theater devices use an Electronics Industry Association ("EIA") standard for multi-point communications know as RS-485.

FIG. 1 shows an illustrative theatre system based on the USITT DMX512 protocol. AC power is provided to a central controller 51, multi-parameter lights 21, 22, 23 and 24, dimmers 31, 32, 33, and fan 41 over standard building electrical wiring 1. A communications cable segment 11 is run from the central controller 51 to a first theatre device in the system, illustratively the fan 41, and additional communication cable segments 12, 13, 14, 15, 16, 17, and 18 sequentially connect the dimmer 33, dimmer 32, dimmer 31, multi-parameter light 21, multi-parameter light 22, multi-parameter light 23, and multi-parameter light 24. While only eight theatre devices are shown in FIG. 1 for clarity, typical theatre systems may have thirty or more theatre devices. Communications during a theatre event is in a single direction, as shown by arrows adjacent the communications cable segments 11–18.

Theatre systems based on the USITT DMX512 protocol typically operate using unidirectional communications. The present DMX protocol specifies three wires: (1) data plus; (2) data negative; and (3) ground. In accordance with the DMX protocol, receivers always operate as receivers and transmitters always operate as transmitters. The present DMX protocol does specify the addition of two more wires, a data plus and data negative, to achieve bi-directional full duplex, but the 5-wire full duplex system has not been readily accepted and is not in widespread use.

While bi-directional full duplex communications under the DMX protocol is not in general use, many theatre devices are nonetheless capable of bi-directional communication and use it for updating (uploading) new or improved software from the manufacturer. For example, manufactures of theatre devices such as automated spotlights and complex microprocessor dimmer systems have need from time to time to provide software updates to their theatre devices. As these devices may be installed at remote locations, two way communications between the theatre devices and a host service computer is conducted over the theatre communications system so that the new software can be uploaded to the theatre devices. Since the RS-485 standard allows for two way communication, the bi-directional communications required for uploading is provided by these manufactures using an RS-485 transceiver at the host computer and RS-485 transceivers at the theatre devices. This bi-directional communication (half duplex) between pairs of RS-485 transceivers is not part of the USITT DMX protocol. Since the bi-directional communication used by these manufacturers is only utilized when the device is being serviced or operated with a manufacture's discrete protocol and not while a controller operating with only the DMX protocol is in use, it does not violate the DMX protocol.

There are various routines used during the upload process. These routines do not have to be DMX512 compatible since during this time they are considered to be in a service mode. This service mode requires that the theatre devices communicate with a host computer or microprocessor. To help facilitate this communication, each theatre device as supplied from the manufacturer typically is equipped with a unique ID number stored within non-volatile memory. This manufacturer supplied unique ID number helps to individually identify the devices to the host computer or microprocessor. In this way, a theatre device may report a failure with the upload process to the host computer or the host computer may find out how may devices are attached to the link to be uploaded. This unique ID number is non-alterable or changeable by the user. During the time when the devices are under the control of a DMX512 compatible controller the devices cannot communicate with each other since the DMX protocol requires a continuous stream of data at 250 Kbaud.

After a theatre system is physically installed, typically it must be set up. A typical setup procedure for a DMX512 compliant unidirectional theatre system such as shown in FIG. 1 requires significant manual intervention and is as follows. A technician connects power and runs data cables 11–18 that carry the DMX512 protocol to the fixtures from the control system 51. Theatre devices that use the DMX512 protocol typically have one or more channels through which various functions thereof are controlled. The channels are set at the device itself, typically by operating address switches or entering the proper commands into the device while watching a display found on the device. FIG. 2 shows an illustrative multi-parameter light 66, which receives power from powerline 68 and is connected into a theatre communications system, typically digital, by cable segments 60 and 62. A display and various controls, generally indicated at 64, are located on the housing of the light 66, and are shown in an enlarged view in FIG. 3. Typical controls include a "menu" button 72, up-count and down-count buttons 76 and 78, and an "enter" button 74. An illustrative channel address "024" appears in display 70. The address "024" is set by pressing the "menu" button 72 until a "channel assign" mode notification appears on the display 70, manipulating the counter buttons 76 and 78 until the desired address appears, and finally pressing the "enter" button 74. Illustrative multi-parameter light devices are described in the product brochure entitled The High End Systems Product Line 1996 and are available from High End Systems, Inc. of Austin, Tex.

Unfortunately, having to manually assign the channels for all of the theatre devices in a theatre system is time consuming and prone to error. Moreover, certain theatre devices such as multi-parameter lights are often required to be placed in hard to reach locations that are accessible only by means of a lift or ladder. In such cases, channel assignments are typically made with the theatre device on the ground, and the theatre device is then lifted to the proper position. When address mistakes are made through human error, the technician must gain physical access to the theatre device by lift or ladder so that he may correct the channel assignment to that required by the operator of the controller.

SUMMARY OF THE INVENTION

One embodiment of the invention is a method of establishing a hierarchy among a plurality of bi-directional theatre devices in a theatre system that uses a unidirectional continuous data stream for remote control during theatre events. The method comprises establishing at least one of the bi-directional theatre devices as a master theatre device and a plurality of the bi-directional theatre devices as slave theatre devices; acquiring in the master theatre device identifying information of the slave theatre devices; and determining the hierarchy using the identified information of the slave theatre devices from the acquiring step and identifying information of the master.

Another embodiment of the invention is a method of establishing a hierarchy among a plurality of bi-directional theatre devices in a theatre system that uses a unidirectional continuous data stream for remote control during theatre events, the method comprising furnishing identifying information from each of the bi-directional theatre devices to others of the bi-directional theatre devices; establishing in the bi-directional theatre devices substantially identically ordered lists of the identifying information for the bi-directional theatre devices; and comparing in each of the bi-directional theatre devices the identifying information thereof with the ordered list established therein to determine a position thereof in the list.

Another embodiment of the invention is a method of establishing a hierarchy among a plurality of bi-directional theatre devices in a theatre system that uses a unidirectional continuous data stream for remote control during theatre events, the method comprising arbitrating among the bi-directional theatre devices having no position in the hierarchy to grant control of the communications link to one of the bi-directional theatre devices; assigning to the bi-directional theatre device granted control in the arbitrating step an unassigned position in the hierarchy; and repeating the arbitrating and assigning steps until all of the bi-directional theatre devices have respective positions in the hierarchy.

A further embodiment of the invention is a microprocessor-controlled theatre device having first identifiers and capable of bi-directional communications for use in a theatre system having a controller for furnishing a unidirectional continuous data stream to a group of theatre devices. over a communications link for remote control thereof during theatre events, wherein the group of theatre devices comprises a plurality of other microprocessor-controlled theatre devices having respective second identifiers and capable of a bi-directional communications, comprising means for selecting between master and slave status during bi-directional communication with the other bi-directional theatre devices in the absence of the unidirectional continuous data stream; means for acquiring the second identifiers from the other bi-directional theatre devices over the communications link when having the master status in the absence of the unidirectional continuous data stream; means for broadcasting the first identifier over the communications link when having the slave status in the absence of the unidirectional continuous data stream; and means for determining the hierarchy using the second identifiers acquired in the acquiring step and the first identifier.

Another embodiment of the invention is a microprocessor-controlled theatre device capable of bi-directional communications for use in a theatre system having a controller for furnishing a unidirectional continuous data stream to a group of theatre devices over a communications link for remote control thereof during theatre events, wherein the group of theatre devices comprises a plurality of other microprocessor-controlled theatre devices capable of a bi-directional communications, comprising means for arbitrating for control of the communications link during bi-directional communication with the other bi-directional theatre devices in the absence of the unidirectional continuous data stream; means for maintaining a count of arbitrations lost; and means for assigning a position in a hierarchy based on the count of arbitrations lost when an arbitration is won.

A further embodiment of the invention is a method for a theatre system that uses a unidirectional continuous data stream from a controller to a group of theatre devices over a communications link for remote control thereof during theatre events, wherein the group of theatre devices comprises a plurality of theatre devices capable of bi-directional communications. The method comprises establishing respective positions in a hierarchy for the bi-directional theatre devices in the absence of the continuous data stream; with the unidirectional continuous data stream, instructing at least one of the theatre devices having a position in the hierarchy to respond; in response to the instructing step, operating at least one of the theatre devices in the hierarchy in accordance with the position thereof in the hierarchy and in a manner that is observable to a human observer; and repeating the instructing and operating steps, wherein at least a portion of the hierarchy is perceptible to the human observer.

Another embodiment is a method of establishing an auxiliary mode of operation in a theatre system having a normal mode of operation that uses a unidirectional continuous data stream from a controller to a group of theatre devices over a communications link for remote control thereof during theatre events, wherein the group of theatre devices comprises a plurality of theatre devices capable of bi-directional communications. The method comprises establishing respective positions in a hierarchy among the bi-directional theatre devices in the absence of the continuous data stream; entering an auxiliary mode key code at the controller to place the theatre devices in the hierarchy into the auxiliary mode of operation using the unidirectional continuous data stream; selecting one of the theatre devices in the hierarchy in accordance with the position thereof in the hierarchy from the controller using the unidirectional continuous data stream; operating the theatre device selected in the selecting step in the auxiliary mode from the controller using the unidirectional continuous data stream; and entering a normal key code at the controller to place the theatre system in the normal mode of operation using the unidirectional continuous data stream.

A further embodiment of the invention is a method of channel assignment in a theatre system having a normal mode of operation that uses a unidirectional continuous data stream from a controller to a group of theatre devices over a communications link for remote control thereof during theatre events, wherein the group of theatre devices comprises a plurality of theatre devices capable of a bi-directional communications. The method comprises establishing respective positions in a hierarchy for the bi-directional theatre devices in the absence of the continuous data stream; applying the unidirectional continuous data stream to the theatre devices in the hierarchy from the controller over the communications link; broadcasting a first instruction on the communications link from the controller to place the theatre devices in the hierarchy in a channel assignment mode of operation; broadcasting a second instruction on the communications link from the controller using the unidirectional continuous data stream to evoke a response from at least one of the theatre devices in the hierarchy; operating at least one of the theatre devices in response to the second instruction in accordance with the position thereof in the hierarchy and in a manner that is observable to a human observer; assigning a channel to the theatre device operated in the operating step using the unidirectional continuous data stream; repeating the second instruction broadcasting step, the operating step, and the assigning step at least once; and broadcasting a third instruction on the communications link from the controller using the unidirectional continuous data to place the theatre system in the normal mode of operation.

Another embodiment of the invention is a method for a theatre system having a normal mode of operation that uses a unidirectional continuous digital data stream to communicate from a controller to a group of theatre devices having different channel addresses over a communications link for control thereof during theatre events, and wherein the controller comprises a plurality of channels. The method, which is to access the theatre devices in the group, comprises establishing in the unidirectional continuous digital data stream a predetermined bit pattern reflecting a particular setting of at least one of the controller channels; and evoking a response to the establishing step by each of the theatre devices of the group.

DETAILED DESCRIPTION OF THE PREFERRED EMBODIMENT

Figure 1:
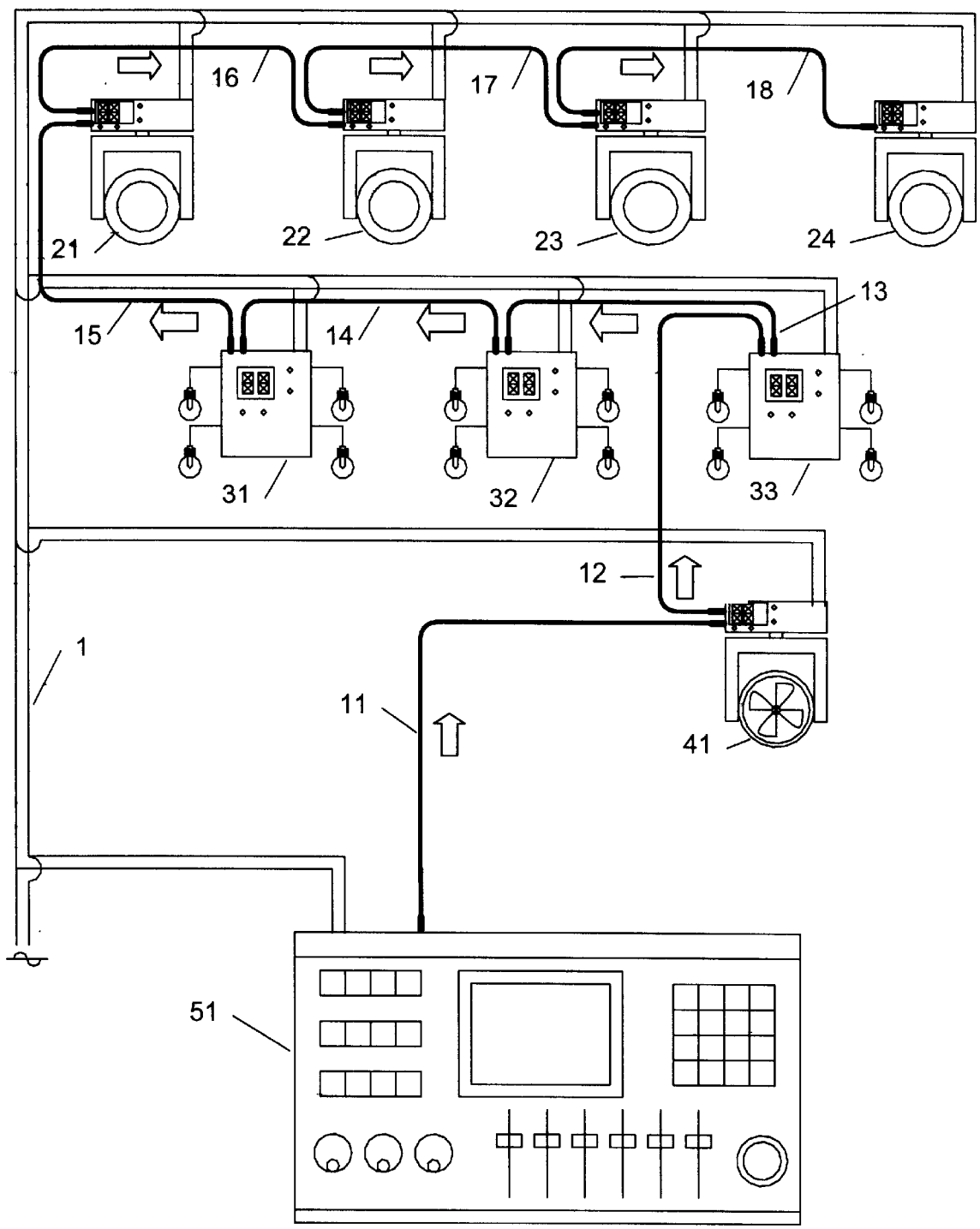
FIG. 1 is a schematic diagram of a lighting system.
Figure 2:
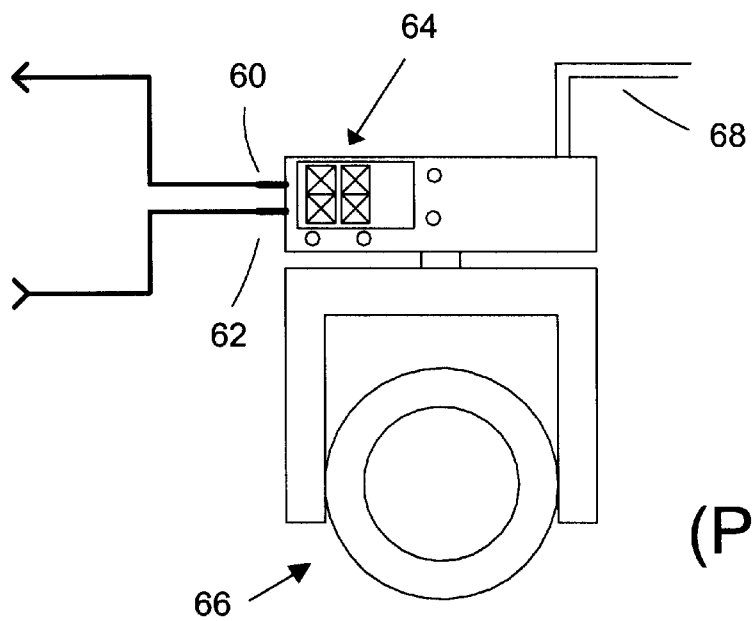
FIG. 2 is a plan front view of a multi-parameter light fixture.
Figure 3:
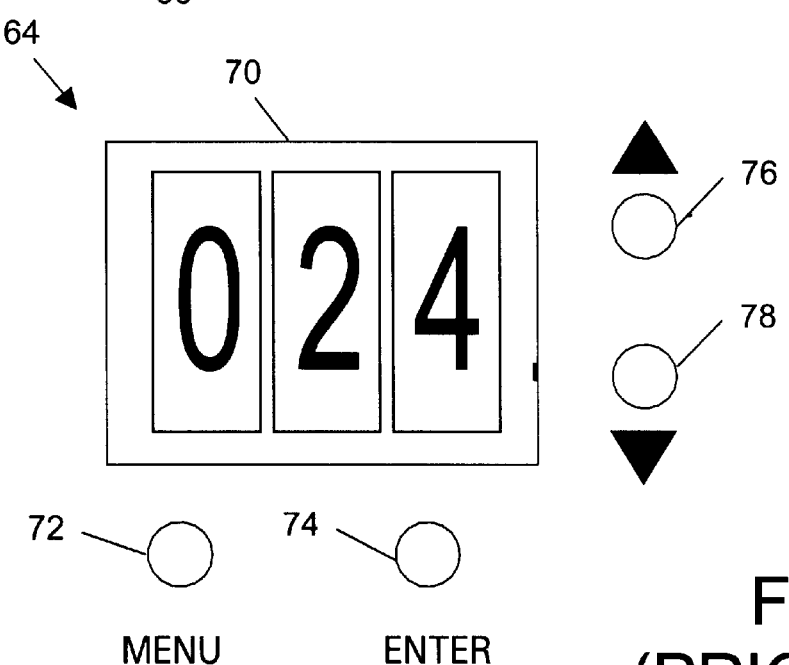
FIG. 3 is an enlarged view of a display and various control buttons of the multi-parameter light fixture of FIG. 2.
Figure 4:
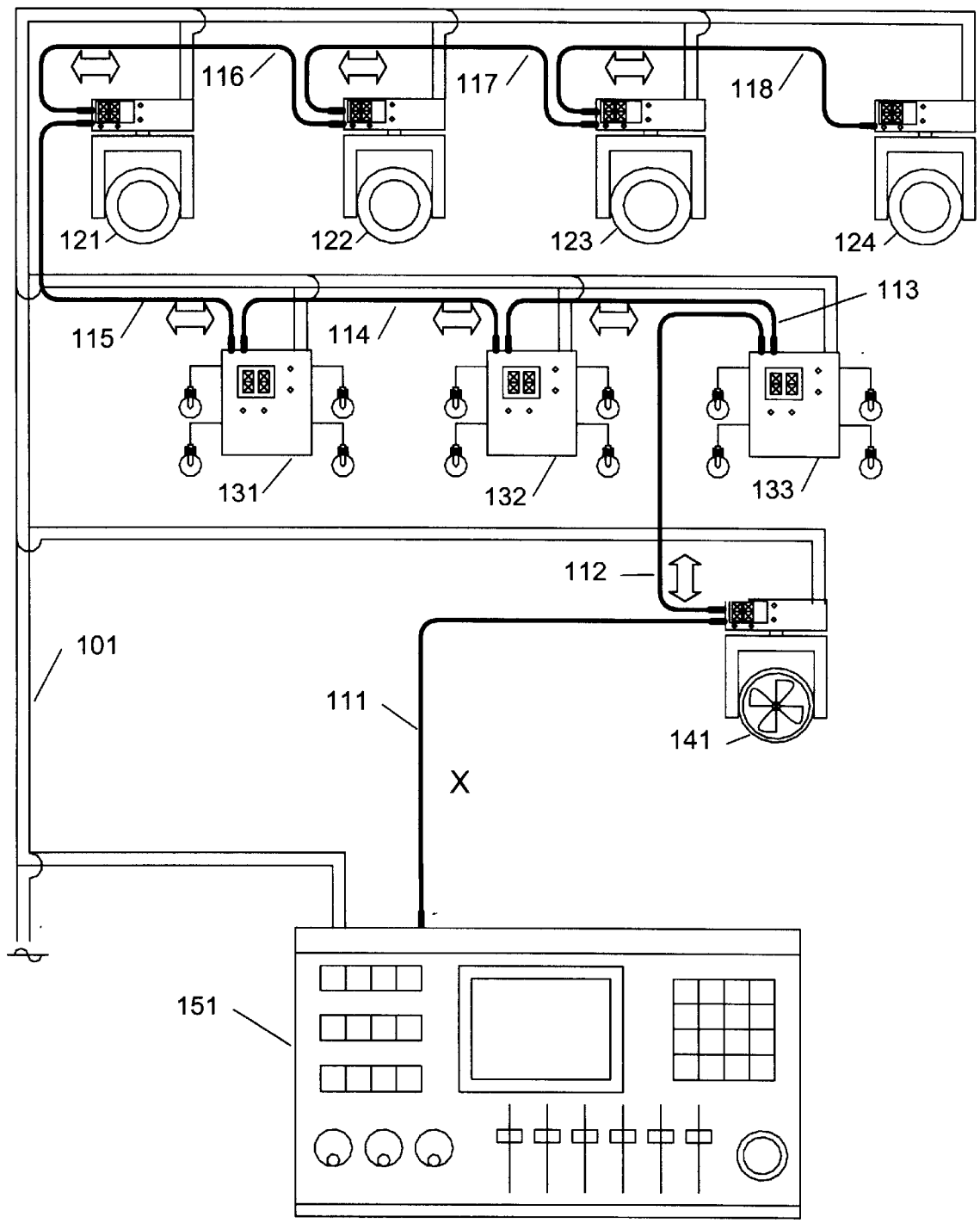
FIG. 4 is a schematic diagram of another lighting system.

FIG. 4 shows an illustrative theatre system that is both compliant with the USITT DMX512 protocol and supports various auxiliary modes such as service and setup modes during which identification by an observer (such as, for example, the operator of the controller) of particular theatre devices is helpful, including remote channel assignment of the various theatre devices included therein. Advantageously, the ability to perform various service and setup tasks remotely eliminates the need for time consuming and costly human assistance, while maintaining compliance with the DMX512 protocol for control of the theatre system during theatre events allows the continued use of existing hardware and installations.

In normal operating mode, the theatre system of FIG. 4 uses a continuous stream of unidirectional digital data from, for example, a DMX compliant controller to the theatre devices. However, the theatre system of FIG. 4 is also capable of operation in various auxiliary modes which rely on the theatre devices having an established hierarchy. A device hierarchy is simply a condition of logical or comprehensible arrangement among the theatre devices, and may be established arbitrarily or by any suitable specific criteria. Device hierarchy is therefor distinguishable from channel assignments, which establish a relationship between the theatre devices and the controller. Auxiliary modes which can advantageously use a device hierarchy include various setup modes such as channel assignment and adjustment of operating parameters, and various service modes such as testing, software updating, and theatre device maintenance.

A device hierarchy is established among the theatre devices in the system that are capable of bi-directional communications. A device hierarchy may be established in any desired way, with or without using information that individually identifies the bi-directional theatre devices. However, preferably each of the bi-directional theatre devices has a pre-assigned device identification ("ID") number, which could be arbitrary or assigned in any convenient way but preferably is assigned by the manufacturer and preferably is unique, and a hierarchy is established preferably in any suitable way using the ID numbers of the bi-directional directional theatre devices. One illustrative way to establish a hierarchy is to create a list of the unique device identification numbers of the bi-directional theatre devices in the theatre system and to determine the position of each in the list. The list may be assembled by one of the bi-directional theatre devices, by some of the bi-directional theatre devices, or by all of the bi-directional theatre devices. Determining the positions of the bi-directional theatre devices in the hierarchy may be performed by each of the bi-directional theatre devices for itself, in which case the bi-directional theatre devices store substantially identical lists (achieved, for example, by having each of the bi-directional theatre device construct a list in accordance with a common criterion or by downloading a list from another device) and each of them compares its unique ID number to the list to establish its position in the list. Alternatively, one of the bi-directional theatre devices may calculate the respective positions in the list of all of the bi-directional theatre devices and communicate the position information for a particular bi-directional theatre device to that device, or two or more of the bi-directional theatre devices may calculate the respective positions in the list of others of the bi-directional theatre devices and communicate the position information to them.

Theatre systems may include theatre devices that either are not capable of bi-directional communications or are not properly programmed to support remote channel assignment. The channel assignments for these theatre devices simply is made manually.

In the lighting system of FIG. 4, AC power is provided to a central controller 151, multi-parameter lights 121, 122, 123 and 124, dimmers 131, 132, 133, and fan 141 over standard building electrical wiring 101. A communications cable segment 111 is run from the central controller 151 to a first theatre device in the system, illustratively the fan 141, and additional communication cable segments 112, 113, 114, 115, 116, 117, and 118 sequentially connect the dimmer 133, dimmer 132, dimmer 131, multi-parameter light 121, multi-parameter light 122, multi-parameter light 123, and multi-parameter light 124. While only eight theatre devices are shown in FIG. 4 for clarity, typical theatre systems have thirty or more theatre devices. The various components of the theatre system of FIG. 4 are available from various manufacturers; for example, multi-parameter lights and controllers are available from High End Systems, Inc. of Austin, Tex.

Figure 5:
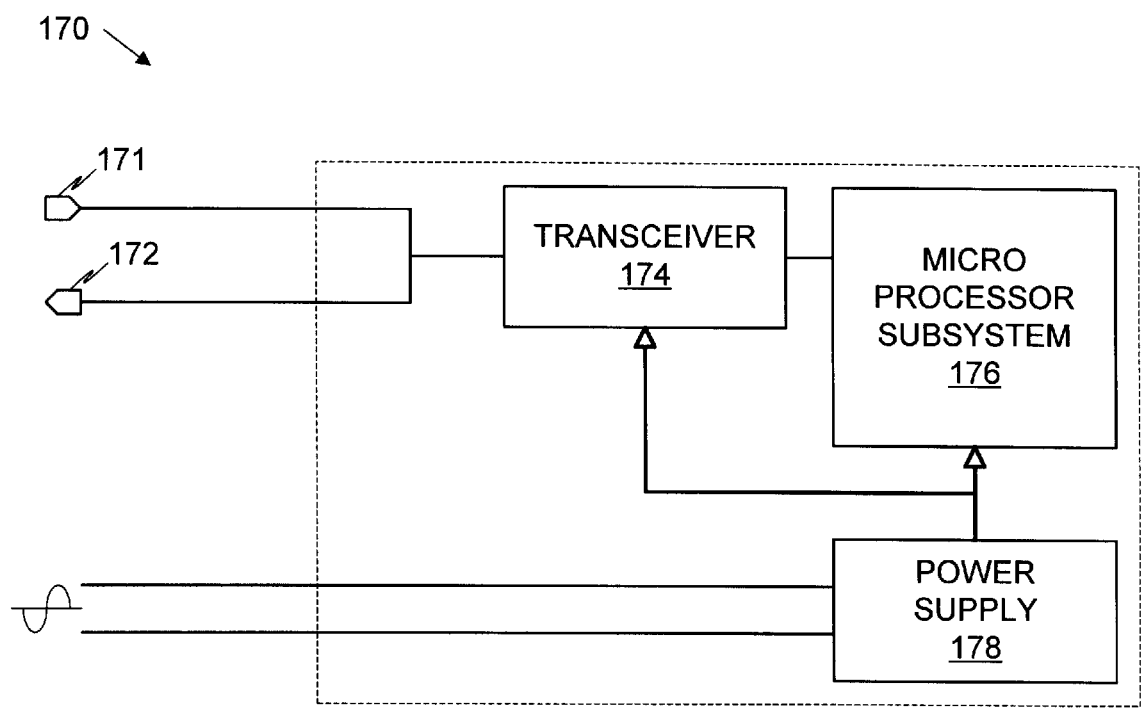
FIG. 5 is a block schematic diagram showing an illustrative arrangement for a communications systems interface.

An illustrative digital circuit 170 for the theatre devices of FIG. 4 is shown in FIG. 5. As these types of circuits are generally well known in the art, the circuit of FIG. 5 has been simplified for clarity to show the arrangement of communications system interfaces relative to the microprocessor and the device terminals. The microprocessor subsystem 176 interfaces to the theatre communications system through a transceiver 174, which is connected to two cables of the theatre communications system through a COM IN terminal 171 and a COM OUT terminal 172. Terminals 171 and 172 are shown in a simple loop-through arrangement, but it will be appreciated that various other terminal arrangements well known in the art are suitable, including unidirectional and bi-directional ports as well as various arrangements of connectors including looped through connectors and connectors that incorporate line amplifiers and pulse shapers. A power supply 178 furnishes power to the transceiver 174 and the microprocessor 176. Suitable circuits are available from various manufacturers, including National Semiconductor, Inc. of Santa Clara, Calif., and Intellon Corporation of Ocala, Fla. It will be appreciated that more than two channels to support more than two communications systems may be provided if desired and a wireless interface may be used instead of the cable interface, as more fully described in U.S. patent application Ser. No. 09/394,300, filed Sep. 10, 1999 (Belliveau, Method and Apparatus for Digital Communications with Multiparameter Light Fixtures), which is hereby incorporated herein by reference in its entirety.

The microprocessor 176 is programmed to respond to unidirectional communications preferably using the USITT DMX512 protocol for control of the theatre devices during an event, as well as to carry out bi-directional communications between transceivers preferably compliant with the RS-485 standard to establish the hierarchy of device identification numbers that is the basis for remote channel assignment for the various theatre devices during setup. The theatre system of FIG. 4 therefor is capable of bi-directional communications among the bi-directional theatre devices therein, as shown by the double-headed arrows adjacent the communications cable segments 112–118. The controller 151 is not transmitting a DMX data stream while the hierarchy is being determined, as indicated by the "X" adjacent the communications cable segment 111. This is accomplished either by unplugging the communications cable segment 111 from the controller 151 or by placing the controller 151 in a standby or power off condition. It will be appreciated that while the bi-directional communication between RS-485 transceivers is not part of the USITT DMX protocol, the DMX protocol is not violated since bi-directional communications are not used during normal operation.

An implementation of an illustrative technique for establishing a hierarchy and an illustrative setup operation suitable for performing channel assignments in the theatre system of FIG. 4 is shown in FIGS. 6–10. During the phase of establishing the hierarchy, illustratively one of the theatre devices is designated a master (because it issues instructions) using preferably an anti-collision communications scheme, and the other bi-directional theatre devices are deemed slaves (because they carry out instructions from the master). The master is in a sense a supervisor, collecting the ID numbers from the slave devices, determining a device hierarchy therefrom, and furnishing each of the slave devices information about its position in the device hierarchy. The master determines a device hierarchy by constructing a list of the ID numbers of the participating bi-directional theatre devices in the theatre system, the hierarchy being the order of ID numbers on the list. The list may be ordered in any desired way, including, for example, arbitrarily as the ID numbers are received or sorted by the value of the ID numbers. The master may furnish each of the slave devices information about its position in the device hierarchy in any suitable way. One suitable way is for the master to broadcast the list to the slaves so that each of the participating bi-directional theatre devices can individually determine their own position in the hierarchy by comparing their respective ID numbers to the individual entries in the list. Another suitable way is for the master to calculate the position of each of the slave devices and successively transmit each position to the proper slave device. This knowledge in each of the theatre devices of its place in the hierarchy is used during a subsequent channel assignment phase by the controller operating under the DMX512 protocol to assign channels to the theatre device. The technique simplifies the assignment of channels to theatre devices which previously were assigned manually at the device during the set up.

If desired, more than one master device may be designated and the multiple master devices may create full or partial lists of device ID numbers based on any suitable criteria and may communicate to their respective slaves information about the position of the slaves in the device hierarchy in any suitable way. If desired, each of the bi-directional theatre devices may work out its own position in the hierarchy in any suitable way, without any of them being designated as a master and with or without the use of device ID numbers. However, the illustrative method shown in FIGS. 6–10 has one of the bi-directional theatre devices assume the role of master for purposes of determining a device hierarchy using unique device ID numbers.

Figure 6:
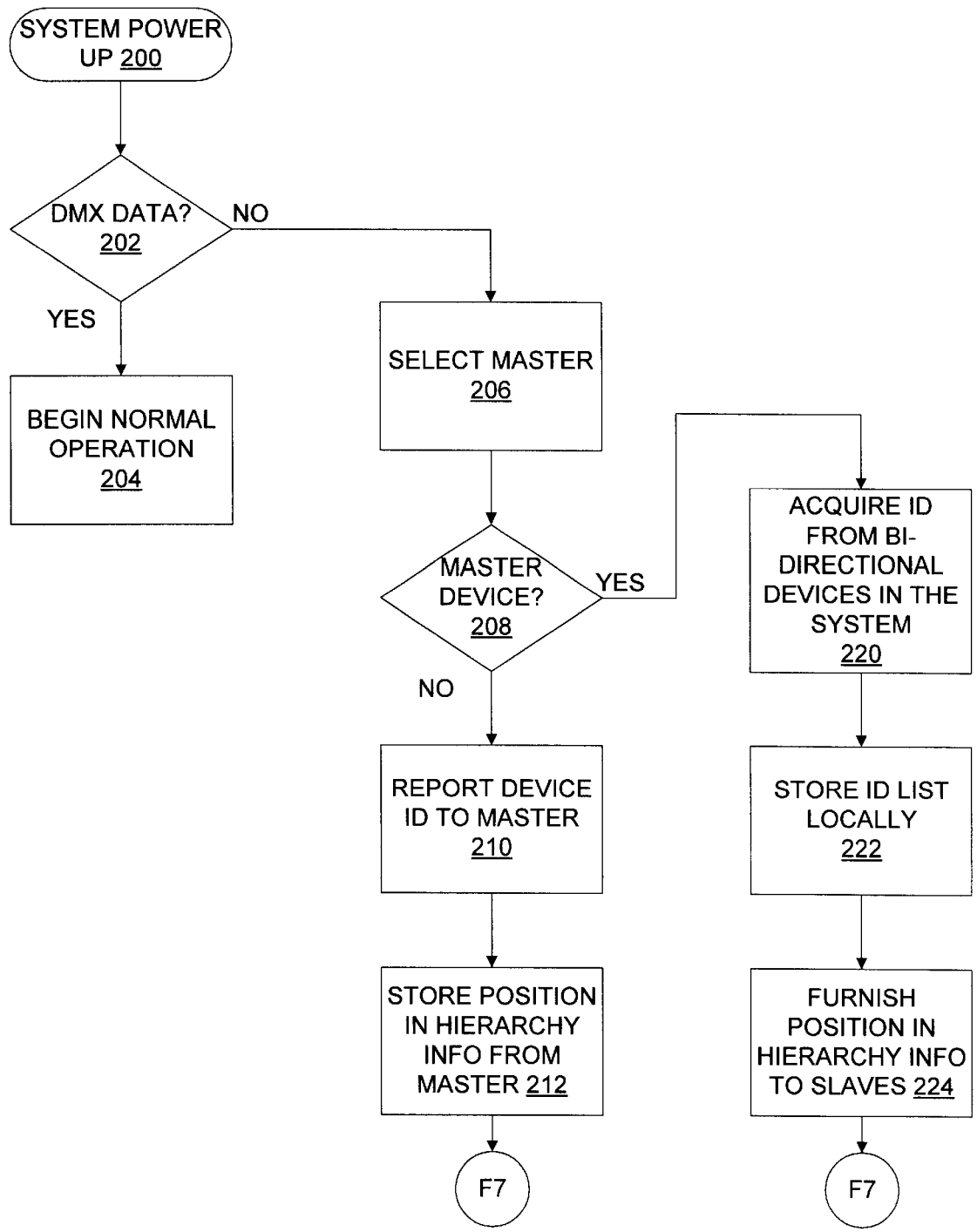
FIG. 6 is a flowchart of a technique for establishing a device hierarchy for the lighting system of FIG. 4.
Figure 7:
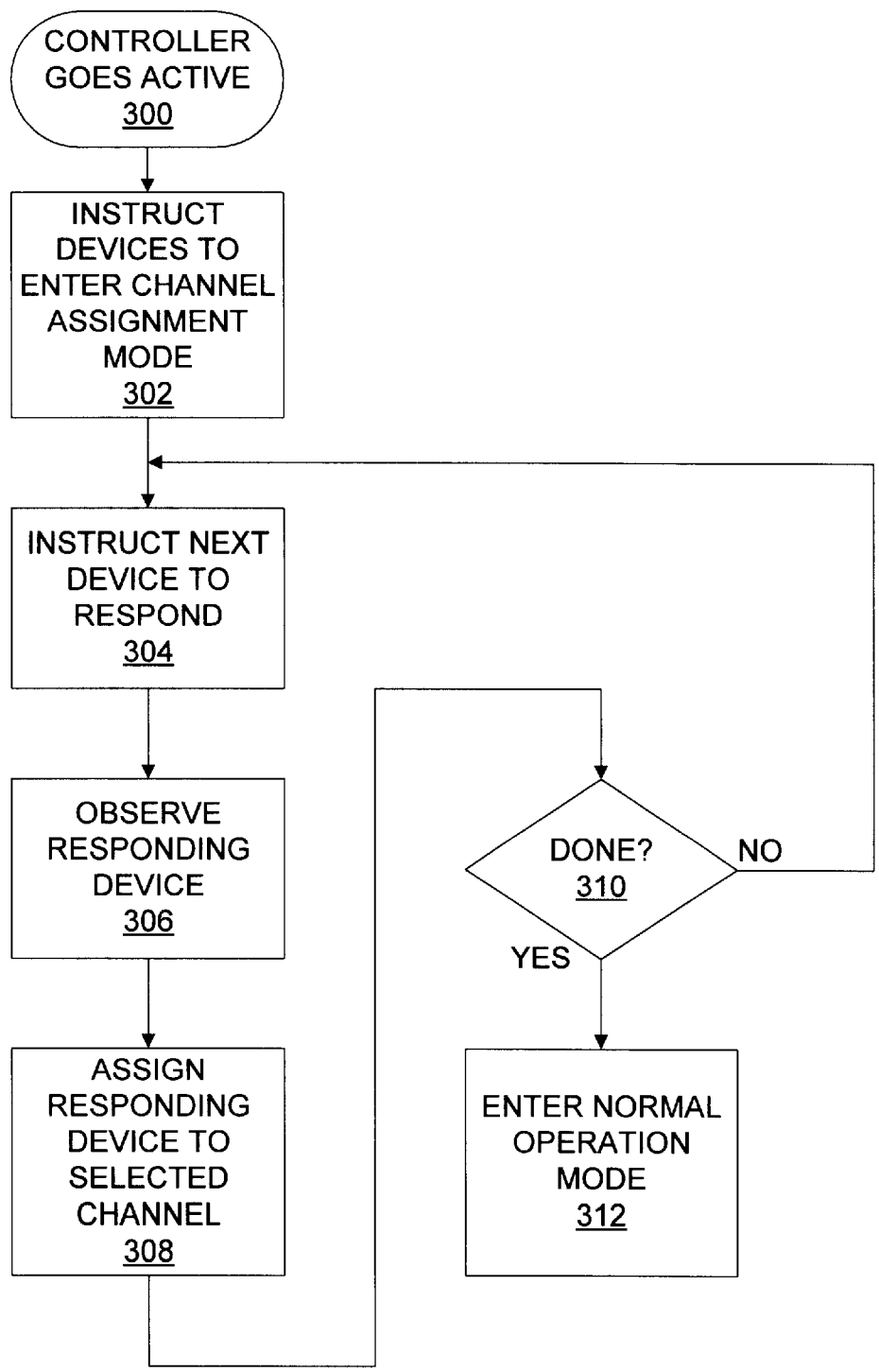
FIG. 7 is a flowchart of a channel assignment technique using the device hierarchy established by the technique of FIG. 6.

FIG. 6 shows a technique that is suitable for execution by theatre device circuits that include microprocessors or suitable logic circuits for establishing a device hierarchy suitable for the lighting system of FIG. 4. FIG. 7 shows a channel assignment technique suitable for execution by a theatre system controller under operator control using the hierarchy established by the technique of FIG. 6. While reference is made to the theatre device circuit 170 (FIG. 5) in describing the technique illustrated in FIG. 6, it will be appreciated that the theatre device circuit 170 is only an example and that the technique illustrated in FIG. 6 may be executed on other types of theatre device circuits.

It will also be appreciated that the anti-collision method described below is only an example of one suitable method, and that a number of other techniques for anti-collision communications may be used. For example, one alternative set of rules is the CSMA/CD (Carrier Sense Multiple Access/Collision Detection) protocol. CSMA/CD is a set of rules determining how network devices respond when two devices attempt to use a data channel simultaneously, which is called a collision. CSMA/CD is well known and commonly used in standard Ethernet networks. Another alternative is the IEEE 802.11 standard, which specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor" which determines the amount of time the node must wait until it is allowed to transmit its packet. During periods in which the channel is clear, the transmitting node decrements its backoff counter. When the channel is busy it does not decrement its backoff counter. When the backoff counter reaches zero, the node transmits the packet. Since the probability that two nodes will choose the same backoff factor is small, collisions between packets are minimized. This standard enables devices to detect a collision. Other illustrative techniques are described in, for example, U.S. Pat. No. 4,096,355, issued Jun. 20, 1978 to Rothauser et al., and in U.S. Pat. No. 4,063,220, issued Dec. 13, 1977 to Metcalfe et al.

The method of FIG. 6 begins when a theatre system is powered up (step 200), although other events such as a system reset may also initiate the method of FIG. 6. The communications link is in place and each of the theatre devices is powered up, but the system controller either is not active or is not plugged into the communications system.

Figure 8:
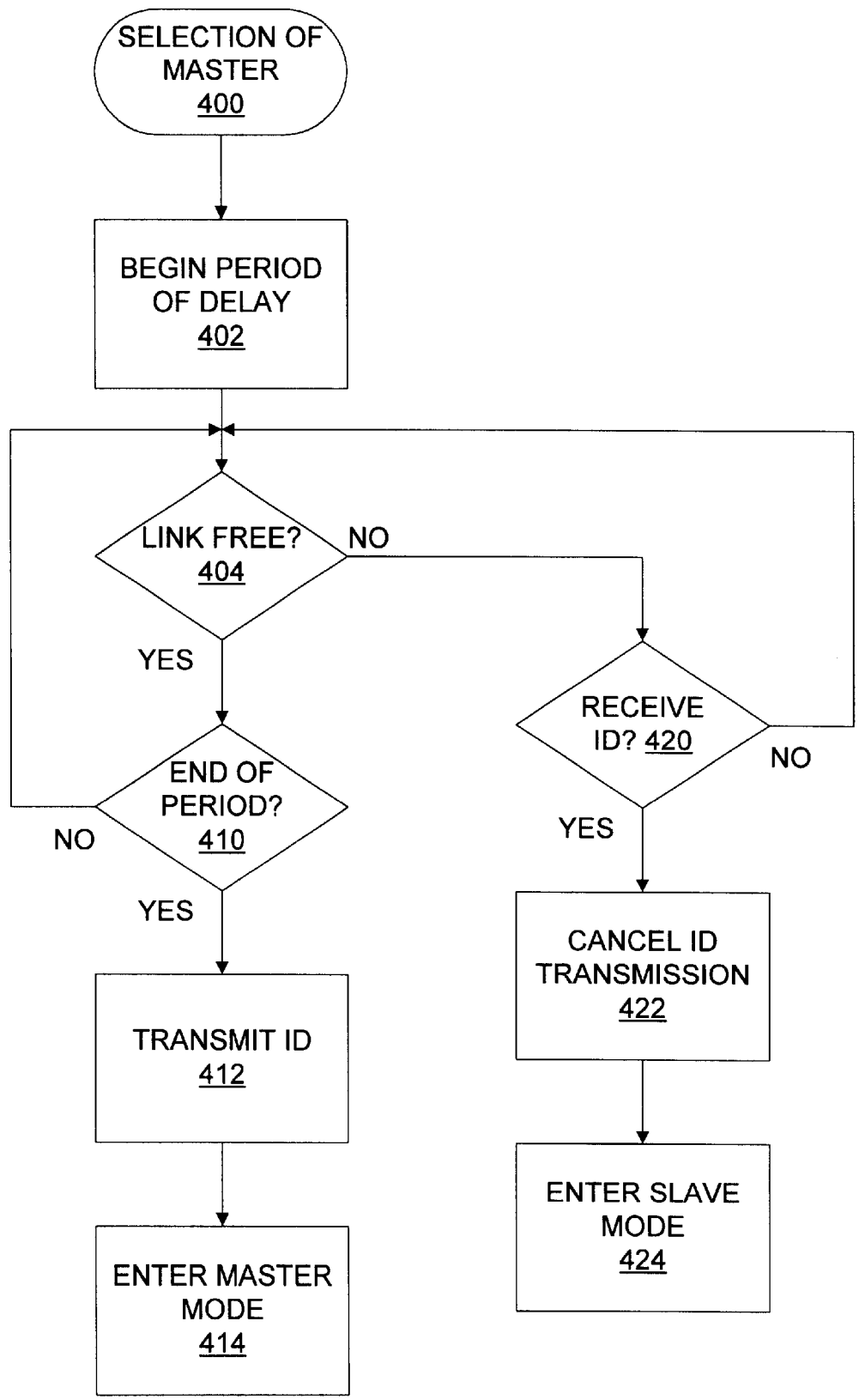
FIG. 8 is a flowchart of a technique for selecting a master theatre device.

The theatre device circuit 170 begins to monitor the communication link (the COM IN terminal 170 and the COM OUT terminal 172 in FIG. 5, for example) for a valid DMX512 data stream (step 202). If a valid data stream is detected (step 202—YES), the theatre device presumes that the channel assignment process has been completed and begins normal operation (step 204). If a valid data stream is not detected (step 202—NO), the theatre device presumes that a device hierarchy is to be established for the theatre system and begins to participate in the process of selecting one of the theatre devices as a master (step 206). An example of a suitable master selection process is shown in FIG. 8 and is further described below.

Figure 9:
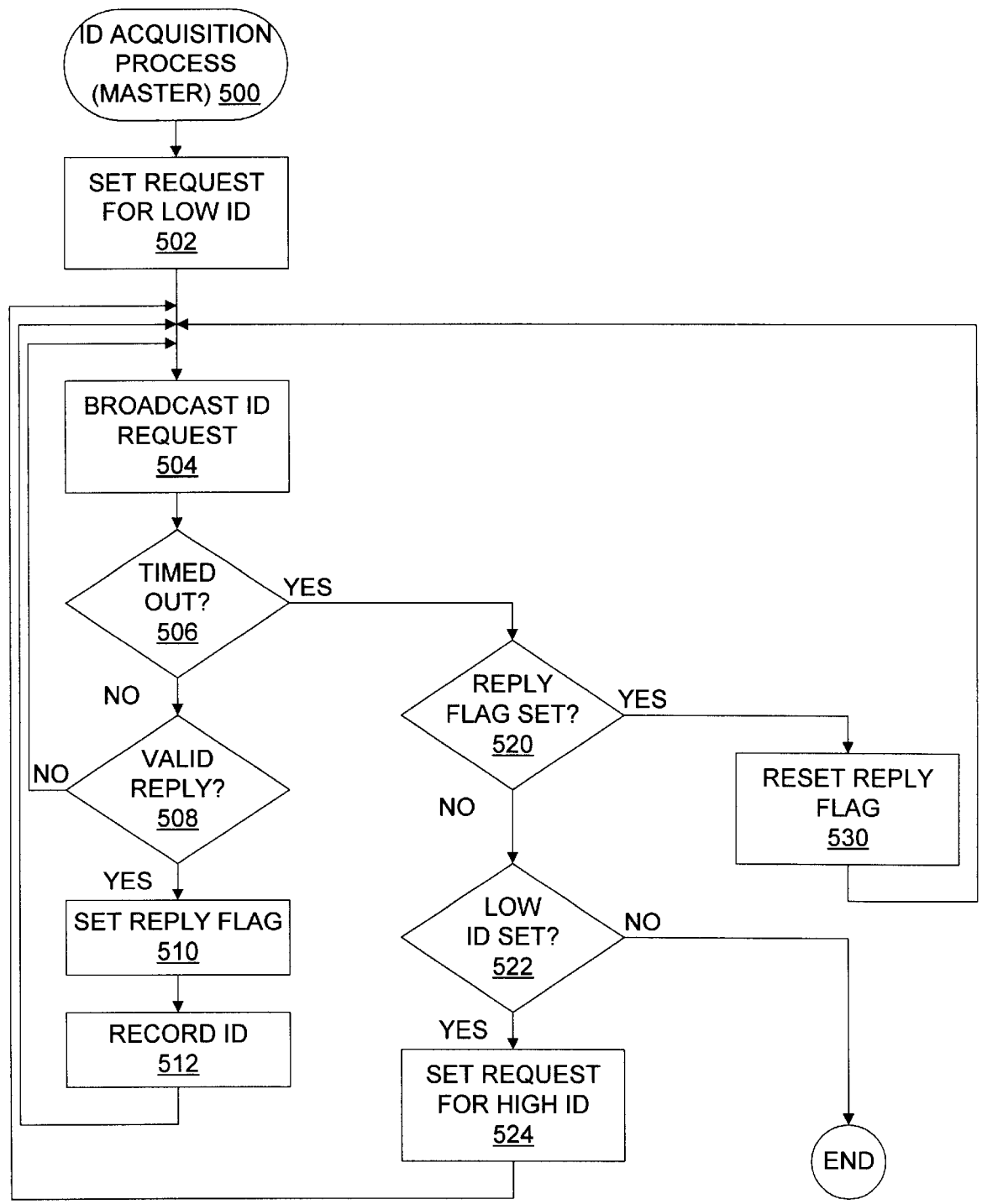
FIG. 9 is a flowchart of a technique useful to a master theatre device to acquire IDs from slave theatre devices.

When in master mode (step 208—YES), the theatre device circuit 170 acquires the unique ID numbers from other bi-directional theatre devices in the theatre system (step 220). An example of a suitable master process for acquiring ID numbers from all theatre devices in the theatre system is shown in FIG. 9 and is further described below. Then a list of the unique ID numbers of the bi-directional theatre devices (including its own unique ID number) is assembled and stored in local memory (step 222). Then information about the position in the hierarchy of the bi-directional theatre devices is furnished to the slave devices (step 224).

Information about the position in the hierarchy of the bi-directional theatre devices may assume various forms. For example, since the list of device ID numbers inherently contains information about the position in the hierarchy of each of the theatre devices on the list, the entire list may be broadcast to all slave devices in the theatre system so that the slave devices can each calculate their own respective positions along with the master device. Alternatively, for example, the master device (using the computing power of the microprocessor 176, for example) itself calculates the position in the hierarchy of each of the other theatre devices on the list, and sends the position value to each of the slave devices using specifically addressed transmissions. Illustratively, a master may calculate that a particular multi-parameter light, for example, having the address "X" has position 9 out of in the hierarchy. The master device transmits a "set hierarchy level" instruction addressed to "X" containing the data 9.

Figure 10:
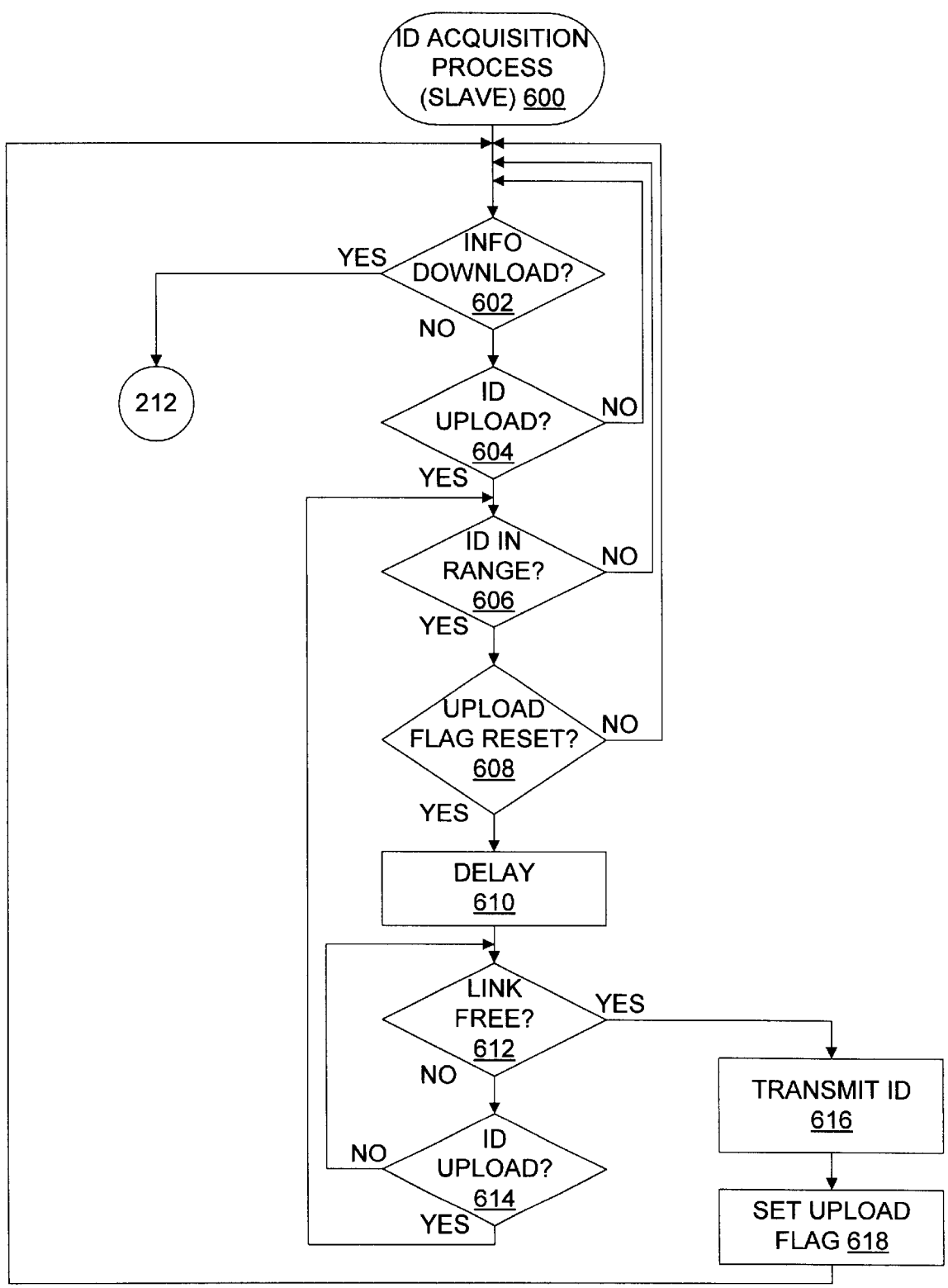
FIG. 10 is a flowchart of a technique useful to a slave theatre device to report its ID to a master theatre device operating in accordance with the technique of FIG. 9.

When in slave mode (step 208—NO), the theatre device circuit 170 reports its unique ID number to the master theatre device in response to an ID number request from the master theatre device (step 210), and then stores its "position in the hierarchy" information when received from the master theatre device (step 212). Information about the position in the hierarchy of the slave device may assume various forms. For example, one form is a list of the ID numbers of all of the participating bi-directional theatre devices in the theatre system which is broadcast by the master. The slave receives the list and compares its ID number with the list to determine its position in the hierarchy. Broadcast of the list to all of the slave theatre devices enables each to check its unique ID against the list to confirm that it is on the list. If a match is not found, an error condition is indicated. Alternatively, the "position in the hierarchy" information is simply a position value. The slave detects a "set hierarchy level" instruction addressed specifically to it and stores the position value contained in the instruction as a parameter. An example of a suitable slave process for reporting its ID number to a master theatre device is shown in FIG. 10 and is further described below.

At worst case, 512 single channel devices are required to be logged by a master, as the DMX512 protocol supports 512 channels. In practice, however, few devices use only one channel, with most using from four to twenty at one time. This means that the actual number of theatre devices on the communications link is likely to be less than 128. Where the RS-485 standard is used, the actual number of theatre devices on the communications link should be 32 or less because the standard so specifies. Completing the list and furnishing information about positions in the hierarchy to the slave theatre devices should easily be accomplished by the master theatre device within minutes of running the communications link and powering the theatre devices.

FIG. 7 shows a channel assignment technique suitable to be carried out by a theatre system controller under operator control using the hierarchy established by the technique of FIG. 6, although any technique for establishing a hierarchy may be used instead. Some of the steps shown in FIG. 7 are performed by the controller hardware, some by the operator, and some jointly. Unless theatre devices that are not compliant with the setup process are present in the theatre system, the operator may assume that no correct channel assignments have been performed manually by any technicians or installers or the like. This means that all channel assignments at the devices must either be from a previous setup or at the factory default.

The operator plays an important role in processes such as the process of FIG. 7. The theatre devices in the hierarchy respond by individually operating in accordance with their position in the hierarchy and in a manner that is observable by the operator, including by a wind, light, sound, or movement response that is preferably but not necessarily a standard theatre effect of the responding theatre device. Upon observing a response from a particular theatre device, the operator may perform an operation such as a setup operation (for example, a channel assignment) or a service operation on the particular responding theatre device. Next, upon perceiving a response from another theatre device in the hierarchy, the operator may perform an operation on that particular responding theatre device, and so forth until all theatre devices in the hierarchy have responded. At that time, the operator may or may not have performed operations on all of the theatre devices, in accordance with the operator's intentions.

The specific channel assignment process shown in FIG. 7 begins when the DMX controller is switched on or when the communications link is connected to the output of an active DMX controller (step 300). Next, to individually access each of the devices with a DMX512 compatible protocol but for purposes other than normal control during theatre events, preferably a specific and unusual combination of channel settings known as a combination code or "key" code should first have to be made on the controller to avoid having the operator accidentally setting or changing channel assignments to devices during normal operation. When the correct key code is entered at the controller, the controller instructs all of the theatre devices on the communications link to enter channel assignment mode (step 302). An illustrative technique for doing this is as follows. It will be appreciated that this technique. is only an example, and other techniques may be used to similar effect.

The DMX channel values initially are set at a default value by the operator, illustratively zero, and a DMX512 signal with all channels set to zero is sent out from the controller onto the communications link. After a minimum time of, for example 10 seconds, and before a maximum time of, for example, 30 seconds, the operator sets the DMX controller so as to cause channel one to be at a particular output level, illustratively 25 plus or minus a tolerance factor of, for example, one. The operator should not step to the value of 25, but rather should set the value of channel one directly to output level 25. All other channels remain at their default values, illustratively zero. After a time period of say two to five seconds, channel one is brought directly back to zero with all other channels remaining at zero. This completes an illustrative key code for causing the theatre devices to assume the channel assignment mode. Although this particular key code specifies particular settings for all of the channels of the controller, it will be appreciated that other key codes may be defined by having only one or just a few of the channels at predetermined values, the setting of the other channels being ignored for purposes of the key code. It will also be appreciated that on some controllers, the key code may be implemented in a macro.

Upon receiving the valid initial DMX signal with all channels set to zero, the theatre devices preferably start their respective internal timers and monitor the communications link for the correct key code to enter channel assignment mode. It will be appreciated that the requirement for the channel assignment mode to be entered preferably within a specific time period after the theatre devices first receive a valid DMX512 signal is a security measure.

Next, the controller generates an instruction for the next theatre device in the hierarchy to respond (step 304), and the next theatre device in the hierarchy responds in a manner observable to a human observer such as the operator of the controller, preferably with a theatre effect, so that it can be identified by the observer (306). The theatre devices in the hierarchy keep track of the number of instructions sent by the controller so that each is able to respond when its position in the hierarchy equals the number of instructions sent.

An illustrative technique for generating an instruction (step 304) is as follows. With the theatre devices in the hierarchy now in channel assignment mode, one of the channels, for example channel one, is assigned to be the selector channel. The operator brings the selector channel output for the DMX control to a particular level, illustratively full, thereby causing a bit pattern to appear in the DMX data stream which is interpreted by the theatre devices in the hierarchy as a selector signal for the next theatre device in the hierarchy to respond. The theatre device next in the hierarchy, for example the theatre device with the lowest ID number that has not previously responded, now responds by operating in a manner that is observable by the operator (step 306). Since each theatre device is aware of its position in the hierarchy, the theatre device having the lowest position responds to the first instruction, the theatre device having the next lowest position responds to the second instruction, and so forth. A suitable response for a dimmer is, for example, to fully turn on the light or device connected to the dimmer, while a suitable response for a multi-parameter light is, for example, for the shutter to open and the light to display some movement. These responses gives the operator of the controller a clear visual indication so that each responding theatre device can be clearly identified. The operator then decides which DMX channel to assign to the identified theatre device for normal operation of the DMX512 control system, and brings the assignment channel selected to a particular level, illustratively full, and then zero. This completes the assignment of the device to the assignment channel selected (step 308). The operator then returns the selector channel to the zero value so that when it is returned to full output the theatre device having the next position in the hierarchy is able to respond. The operator continues this procedure until all devices have been assigned channels.

If the channel assignment of a device is required to be the selector channel, illustratively channel one, it is only necessary to identify the device by using the selector channel and then returning the selector channel to zero. The action of raising and lowering the selector channel without raising another channel is interpreted as an assignment of the selector channel to the theatre device.

When assigning DMX channels to a multiple channel theatre device (step 308), the operator need assign a DMX channel only once to the theatre device. The theatre device accepts the DMX assignment channel as its start channel and automatically completes channel assignment for all of its channels using the appropriate number of consecutive DMX channels. The operator is aware of the number of channels required by each of the theatre devices and typically has a channel assignment map prepared on paper, so that the operator can avoid making any overlapping channel assignments. For example, if a particular theatre device uses ten DMX channels to function, the operator may decide to assign its start channel to DMX channel 050 and assign the start channel of the next theatre device to DMX channel 060. This would be entirely proper since the particular theatre device would operate on DMX channels 050 through 059 due to the automatic assignment of channels.

When all theatre devices in the hierarchy have been assigned operating channels, one of the theatre devices that previously responded again responds when the operator raises the selector channel output. Observing this, the operator concludes that the channel assignment exercise is completed (step 310—YES) and may then go on to normal operation by reproducing a combination of specific actions at the controller. An illustrative combination involves returning all DMX512 outputs to zero for a predetermined time period, then once again bring channel one (i.e., the selector channel) to a value of 25 (plus or minus one) also for a predetermined time period, then returning all DMX512 values to zero. Normal operation then commences with all theatre devices responding in accordance with their new channel assignments (step 312).

Figure 11:
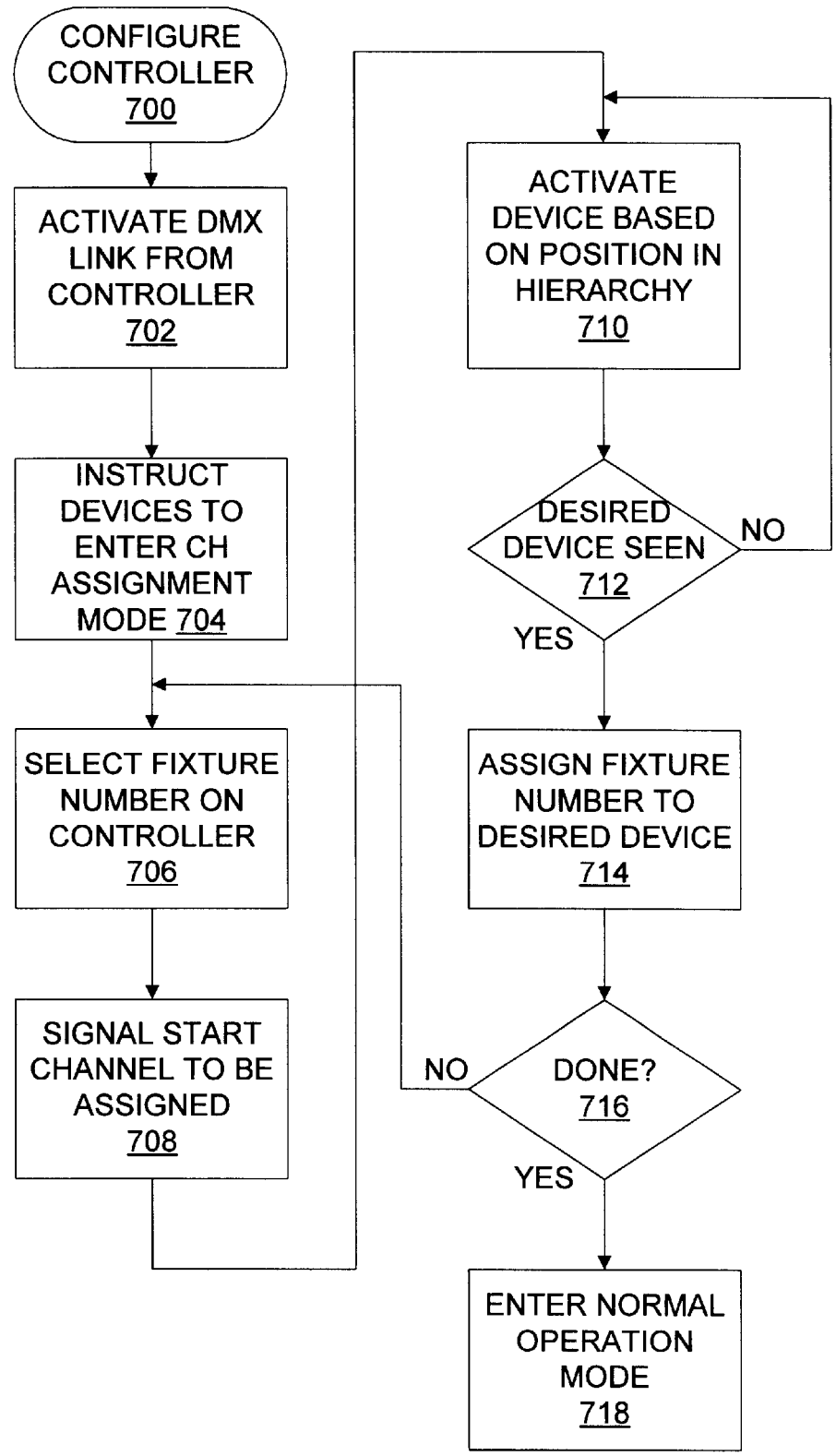
FIG. 11 is a flowchart of another channel assignment technique using the device hierarchy established by the technique of FIG. 6.

Another example of a channel assignment technique is shown in FIG. 11. The technique of FIG. 11 allows the setting of DMX start addresses for theatre devices without the operator having to have explicit knowledge of the precise DMX channels utilized, and is useful in conjunction with certain types of controllers that are pre-programmed with setup information about a variety of different types of theatre devices and are able to accept setup information such as the number and type of fixtures in the lighting system. The channel assignment technique of FIG. 11 uses a device hierarchy that is established for the bi-directional theatre devices as described elsewhere in this document during the absence of the DMX signal.

First, the controller is configured by the operator with the theatre devices required for the theatre event laid out in the desired order on the screen of the controller (step 700). For example, for a theatre system having five multi-parameter lights of type "X" having ten channels each with the first two channels being for pan and tilt, the operator specifies 5 devices of type X on the controller. The controller knows that a type X device has ten channels and that the first two channels are pan and tilt, which is significant because the controller has dedicated knobs for such effects as pan, tilt, color, focus, pattern, dimmer, strobe, and so forth. The operator then stacks the five lights in the blocks of ten resembling type X side-by-side on the controller screen.

Next, the operator activates DMX communications on the controller (step 702) and enters a key code to place the theatre devices in the hierarchy into a channel assignment mode (step 704). An illustrative key code is any desired sequence of discrete Pan and Tilt values. The values are established within a certain tolerance, say one percent, so that the theatre devices in the hierarchy are able to correctly recognize the key code, and the sequence is sufficiently long so as to minimize the chance of the key code being generated by chance during the normal programming of a theatre event. Directly after the key code is sent, the theatre devices in the hierarchy indicate that they have entered into the channel assignment mode by flashing their lights or in any other desired way.

Next, the operator selects a theatre device number on the lighting control desk that is to be assigned first (step 706).

Next, the operator indicates the start channel that is about to be assigned (step 708) by raising the tilt channel for the selected theatre device number on the lighting control desk to a particular level, illustratively full. This signal is recognized by the lighting devices in the hierarchy, which respond in any suitable manner (color or other observable change) to indicate that the signal has been recognized. The operator then moves the Pan channel to select from amongst the theatre devices in the hierarchy. As the Pan channel is moved through its full range, each theatre device in the hierarchy in turn becomes active (color or other observable change while the other devices go static) and available for selection (step 710 and step 712—NO). Once the theatre device which the operator wishes to identify with the selected theatre device number is found by observing its response (step 712—YES), the operator brings the Tilt channel back down to an arbitrary threshold level, illustratively zero (step 714). This signals the observed theatre device to set its own DMX starting address to the value pointed to by the specific Tilt channel.

The procedure is repeated as required (step 716—NO) by selecting a new fixture number at the lighting control desk, raising its Tilt channel, and operating the Pan channel to select a particular theatre device.

When the operator is finished with the procedure (step 716—YES), the operator sends a second key code sequence of any desired Pan and Tilt values to return the theatre devices of the lighting system to normal operation (step 718). Any interruption of the DMX signal also returns the fixtures to normal operation mode.

An example of a suitable master arbitration process 400, which involves an illustrative anti-collision measure, is shown in FIG. 8. The process 400 is carried out by each of the bi-directional theatre devices on the communications link that is suitably programmed to participate. After power up and in the absence of DMX data on the communications link (see steps 200 and 202 in FIG. 6), each participating theatre device initiates a period of delay (step 402) before transmitting its unique ID code. The delay period should have a reasonable probability of being unique among the theatre devices in the theatre system and may be generated in any of a variety of ways, such as, for example, by an on-board microprocessor such as the microprocessor 176 running a random number generator or a hash function applied to the unique ID of the theatre device. This delay helps to reduce collisions that would otherwise occur as multiple theatre devices try to communicate their unique ID on the communications link at once. Next, the participating theatre device samples the communications link to detect whether the communications link is free (step 404). If the link is not free (step 404—NO) and the theatre device detects a first complete transmission of a unique ID (step 420—YES) on the link, the theatre device cancels the process for transmitting its unique ID (step 422) and enters into slave mode (step 424). However, if the theatre device does not detect another ID transmission on the communications link (step 404—YES) by the end of the delay period (step 410—YES), it sends its own unique ID out over the communications link (step 412) and enters master mode (step 414).

Examples of suitable processes 500 and 600 that run on a theatre device for constructing a table of unique ID numbers from all theatre devices in the theatre system is shown in FIGS. 9 and 10. The process 500 of FIG. 9, which involves an illustrative anti-collision measure, is executed by a theatre device in master mode. The process 600 of FIG. 10 is executed by a theatre device in slave mode.

A theatre device in master mode (hereinafter "master device") broadcasts a request over the communications link for all theatre devices in slave mode (hereinafter "slave devices") having ID numbers lower than the ID number of the master device to report their ID numbers to the master device, as shown in FIG. 9 (steps 502 and 504). If the master device has not timed out (step 506—NO), it looks for a valid reply on the communications link to its request (step 508).

In the meantime and as shown in FIG. 10, each slave device that detects the ID upload request (step 604—NO and step 604—YES (see also step 504, FIG. 9)), makes a determination that its ID number meets the requirement specified in the ID upload request (step 606—YES) (initially whether the ID number is lower than the master ID number and subsequently whether the ID number is higher than the master ID number), and concludes that it has not previously uploaded its ID to the master device as tracked by an upload flag (step 608—YES), enters into a waiting period for a certain time (step 610) before broadcasting its unique ID number. The delay period should have a reasonable probability of being unique among the theatre devices in the theatre system and may be generated by the slave device in any of a variety of ways, as described previously.

When the delay period expires, the slave device checks to determine if the communications link is free (step 612). If the link is free (step 612—YES), the slave device then transmits its unique ID number (step 616) over the link. The slave device then sets the upload flag (step 618) so that it can avoid responding to follow up upload requests from the master device. If the link is not free (step 612—NO), the slave device checks if the traffic on the link is a follow up ID number request (step 614). If not (step 614—NO), the process returns to checking the link to determine whether it is free (step 612). If the traffic on the link is a follow up ID number request, then the master device has initiated a new session and the process on the slave device returns to making a determination that its ID number meets the requirement specified in the ID upload request (step 606—YES) and that it has not previously uploaded its ID to the master device as tracked by the upload flag (step 608 YES), and enters again into the waiting period (step 610) before attempting to broadcast its unique ID number.

With reference again to the master device process of FIG. 9, the master device monitors the link for a valid reply (step 508), which includes the ID number along with any desired degree of error checking. If the reply is valid (step 508—YES), the master device sets a reply flag (step 510) which is used to detect completion of the ID acquisition process, and records the ID number in a list (step 512). When the process times out (step 506—YES) after one or more ID numbers has been recorded (step 506—YES and step 520—YES), possibly some slave devices may not have been able to reply to the ID number upload request from the master due to conflicts. Accordingly, the reply flag is reset (step 530) and a follow up broadcast request is done (step 504). The process is repeated until no more replies are received, as indicated by a reset reply flag (step 520—NO).

When all slave devices having ID numbers lower that the ID number of the master device have responded, the master device then restates the ID request specifically for slave devices whose ID numbers are greater than the ID number of the master device (step 524) and does a new broadcast (step 504). The process of FIG. 9 continues from that point as described above. The master process of FIG. 9 concludes with the determination that both a low ID number upload request and a high ID number upload request have been made and processed (step 522—NO).

While FIGS. 6–10 pertain to establishing a device hierarchy which is used to make channel assignments to theatre devices remotely from a controller, the establishing of a device hierarchy is useful for subsequently performing a variety of other operations remotely on theatre devices by entering specific key codes for specific auxiliary operating modes. An example of an auxiliary operating mode is a service mode, wherein theatre devices perform self test sequences that the operator can observe. Another example of an auxiliary operating mode is to set up quiet mode, wherein cooling system noise from particular theatre devices is reduced. Another example of an auxiliary operating mode is to set up a reduced capacity mode, wherein particular theatre devices are set so that they use fewer DMX channels. Another example of an auxiliary operating mode is to set up a high speed mode, wherein particular theatre devices are set to achieve high speed parameter changes.

While various techniques for establishing a hierarchy among the bi-directional theatre devices have been described, these are illustrative and other techniques may be used as well. Some of these other techniques may involve device ID codes and some may not. For example, one technique using device ID codes involves having each bi-directional theatre device that has not transmitted its ID code arbitrate for control of the communications link. When a bi-directional theatre device obtains control of the communications link, it broadcasts its ID code to the other bi-directional theatre devices, adds its ID code to its list, and thereafter ceases to participate in arbitration. The other bi-directional theatre devices add the broadcast ID code to their list, and those that have not previously broadcast their ID codes again arbitrate for control of the communications link and repeat the process. At the end of the process, the bi-directional theatre devices contain substantially identically ordered lists of the ID codes for the bi-directional theatre devices. The lists are ordered by time of receipt, although other criterion such as ID number may be used. Each then compares its ID code with the list to determine its position in the list. An alternative technique that does not use device ID codes involves having each bi-directional theatre device that does not have an assigned position in the hierarchy arbitrate for control of the communications link and keep a count of the number of arbitrations entered into. When a bi-directional theatre device "wins" the arbitration by obtaining control of the communications link, it assigns itself a position in the hierarchy based on the current arbitration count and thereafter ceases to participate in arbitration. The other bi-directional theatre devices which have "lost" the arbitration resume arbitration for control of the communications link and repeat the process. At the end of the process, each of the bi-directional theatre devices contains a number that is its position in the hierarchy.

Another technique for establishing a hierarchy among the bi-directional theatre devices involves using the microprocessor in the theatre device to run a random number generator during the hierarchy establishing process. In this way theatre devices that do not have a permanent unique ID number stored at the factory may derive a randomly generated ID number that is probably unique so they may participate in the hierarchy establishing process.

During the process of identifying theatre devices in the hierarchy for making channel assignments or performing other setup or service operations, preferably each the theatre devices in the hierarchy respond to successive instructions for the next theatre device to respond. In the technique of FIG. 7, a series of selector signals from a channel on the controller designated as a selector channel is used to instruct successive theatre device in the hierarchy to respond. In the technique of FIG. 11, theatre devices having positions in the hierarchy corresponding to settings on the Pan channel respond as the Pan channel is moved through its range while the Tilt channel for a selected theatre device number is at full level. However, as an alternative the theatre devices in the hierarchy that have not been assigned channels may be programmed to respond in succession based on their position in the hierarchy each time a single response sequence initiation instruction is sent by the controller. In this event, the operator, having decided which DMX channel to assign to which theatre device, operates the appropriate assignment channel in a particular way, such as, for example, by bringing the assignment channel to full and then to zero, when the theatre device desired for the assignment is observed to operate.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. In a theatre system using a unidirectional continuous data stream from a controller to a group of theatre devices over a communications link for remote control thereof during theatre events, wherein the group of theatre devices comprises a plurality of theatre devices capable of bi-directional communications and having respective identifying information, a method of establishing a hierarchy among the bi-directional theatre devices in the absence of the unidirectional continuous data stream comprising:

establishing at least one of the bi-directional theatre devices as a master theatre device and a plurality of the bi-directional theatre devices as slave theatre devices;

acquiring in the master theatre device the identifying information of the slave theatre devices; and determining the hierarchy using the identified information of the slave theatre devices from the acquiring step and the identifying information of the master.

2. A method as in claim 1 wherein the determining step comprises communicating information about positions of the master and slave theatre devices in the hierarchy from the master theatre device to the slave theatre devices.

3. A method as in claim 1 wherein the determining step comprises:

forming in the master theatre device a list of the identifying information of the master and slave theatre devices, the hierarchy being based on the list;

broadcasting the list from the master theatre device to all of the slave theatre devices; and comparing in each of the master and slave theatre devices the identifying information thereof with the list to determine a position thereof in the list.

4. A method as in claim 1 wherein the determining step comprises communicating information about positions of the slave theatre devices in the hierarchy from the master theatre device to the slave theatre devices.

5. A method as in claim 1 wherein the determining step comprises:

forming in the master theatre device a list of the identifying information of the master and slave theatre devices, the hierarchy being based on the list;

calculating in the master theatre device from the list respective positions in the list of the master and slave theatre devices; and transmitting to the slave theatre devices the respective positions thereof in the list.

6. A method as in claim 1 wherein the determining step comprises:

forming in the master theatre device a list of the identifying information of the slave theatre devices, the hierarchy being based on the list;

broadcasting the list from the master theatre device to all of the slave theatre devices; and comparing in each of the slave theatre devices the identifying information thereof with the list to determine a position thereof in the list.

7. A method as in claim 1 wherein the establishing step comprises:

initiating in the bi-directional theatre devices respective delay periods; and designating one of the bi-directional theatre devices as the master theatre device based on the delay period thereof.

8. A method as in claim 7 wherein one of the delay periods is shorter than the others, and wherein the designating step comprises:

monitoring in each of the bi-directional theatre devices the communications link for a transmission of identifying information during the delay period;

identifying one of the bi-directional theatre devices having the shortest delay period as the master theatre device;

broadcasting onto the communications link the unique identifying information from the master theatre device; and receiving the unique identifying information from the master theatre device in the other bi-directional theatre devices to establish the other bi-directional theatre devices as slave theatre devices.

9. A method as in claim 1 wherein the acquiring step comprises:

broadcasting a request for all of the slave theatre devices having identifying information meeting a first criterion to transmit the identifying information thereof on the communications link; and receiving the identifying information on the communications link from the broadcasting step.

10. A method as in claim 1 wherein the determining step comprises forming in the master theatre device a list of the identifying information of the master and slave theatre devices, the list being assembled in order of receipt of the identifying information from the acquiring step and the hierarchy being based on the list.

11. A method as in claim 1 wherein the identifying information for each of the bi-directional theatre devices comprises a numerical value, and wherein the determining step comprises forming in the master theatre device a list of the identifying information of the master and slave theatre devices, the identifying information in the list being ordered based on the numerical values thereof and the hierarchy being based on the list.

12. A method as in claim 1 wherein the identifying information is an arbitrary code for each of the bi-directional theatre devices.

13. A method as in claim 1 wherein the identifying information is a unique code for each of the bi-directional theatre devices.

14. A method as in claim 1 wherein the identifying information is a unique code for each of the bi-directional theatre devices established at time of manufacture thereof.

15. A method as in claim 1 wherein the bi-directional theatre devices are compliant with a DMX512 protocol.

16. In a theatre system using a unidirectional continuous data stream from a controller to a group of theatre devices over a communications link for remote control thereof during theatre events, wherein the group of theatre devices comprises a plurality of theatre devices capable of a bi-directional communications and having respective identifying information, a method of establishing a hierarchy among the bi-directional theatre devices in the absence of the unidirectional continuous data stream comprising:

furnishing the identifying information from each of the bi-directional theatre devices to others of the bi-directional theatre devices;

establishing in the bi-directional theatre devices substantially identically ordered lists of the identifying information for the bi-directional theatre devices; and comparing in each of the bi-directional theatre devices the identifying information thereof with the ordered list established therein to determine a position thereof in the list.

17. A method as in claim 16 wherein for each of the bi-directional theatre devices the establishing step comprises placing the identifying information into the lists when furnished in the furnishing step.

18. A method as in claim 16 wherein for each of the bi-directional theatre devices the establishing step comprises sorting the identifying information in the lists by a common criterion.

19. A method as in claim 16 wherein the identifying information is an arbitrary code for each of the bi-directional theatre devices.

20. A method as in claim 16 wherein the identifying information is a unique code for each of the bi-directional theatre devices.

21. In a theatre system using a unidirectional continuous data stream from a controller to a group of theatre devices over a communications link for remote control thereof during theatre events, wherein the group of theatre devices comprises a plurality of theatre devices capable of a bi-directional communications, a method of establishing a hierarchy among the bi-directional theatre devices in the absence of the unidirectional continuous data stream comprising:

arbitrating among the bi-directional theatre devices having no position in the hierarchy to grant control of the communications link to one of the bi-directional theatre devices;

assigning to the bi-directional theatre device granted control in the arbitrating step an unassigned position in the hierarchy; and repeating the arbitrating and assigning steps until all of the bi-directional theatre devices have respective positions in the hierarchy.

22. In a theatre system that uses a unidirectional continuous data stream from a controller to a group of theatre devices over a communications link for remote control thereof during theatre events, wherein the group of theatre devices comprises a plurality of theatre devices capable of bi-directional communications, a method comprising:

establishing respective positions in a hierarchy for the bi-directional theatre devices in the absence of the continuous data stream;

with the unidirectional continuous data stream, instructing at least one of the theatre devices having a position in the hierarchy to respond;

in response to the instructing step, operating at least one of the theatre devices in the hierarchy in accordance with the position thereof in the hierarchy and in a manner that is observable to a human observer; and repeating the instructing and operating steps, wherein at least a portion of the hierarchy is perceptible to the human observer.

23. A method as in claim 22 wherein the establishing step comprises establishing the respective positions of the bi-directional theatre devices in the hierarchy based on successive arbitrations for control of the communications link by the bi-directional theatre devices.

24. A method as in claim 22 wherein the bi-directional theatre devices comprise respective identifying information, and wherein the establishing step comprises establishing the respective positions of the bi-directional theatre devices in the hierarchy based on the respective identifying information of the bi-directional theatre devices.

25. A method as in claim 24 wherein the identifying information is an arbitrary code for each of the bi-directional theatre devices.

26. A method as in claim 24 wherein the identifying information is a unique code for each of the bi-directional theatre devices.

27. A method as in claim 22 wherein:

the instructing step comprises placing a selector signal on the communications link; and wherein the operating step comprises operating only one of the theatre devices in response to the selector signal.

28. A method as in claim 22 wherein:

the instructing step comprises placing a response sequence initiation instruction on the communications link; and wherein the operating step comprises operating a succession of the theatre devices in response to the response sequence initiation instruction.

29. In a theatre system having a normal mode of operation that uses a unidirectional continuous data stream from a controller to a group of theatre devices over a communications link for remote control thereof during theatre events, wherein the group of theatre devices comprises a plurality of theatre devices capable of bi-directional communications, a method of establishing an auxiliary mode of operation comprising:

establishing respective positions in a hierarchy among the bi-directional theatre devices in the absence of the continuous data stream;

entering an auxiliary mode key code at the controller to place the theatre devices in the hierarchy into the auxiliary mode of operation using the unidirectional continuous data stream;

selecting one of the theatre devices in the hierarchy in accordance with the position thereof in the hierarchy from the controller using the unidirectional continuous data stream;

operating the theatre device selected in the selecting step in the auxiliary mode from the controller using the unidirectional continuous data stream; and entering a normal key code at the controller to place the theatre system in the normal mode of operation using the unidirectional continuous data stream.

30. A method as in claim 29 wherein the selecting step comprises:
setting a selector channel of the controller to generate a selector signal on the communications link; and
in response to the selector signal, activating one of the theatre devices in the hierarchy in accordance with the position thereof in the hierarchy and in a manner that is observable to a human observer;
and wherein the operating step comprises setting at least one selected channel of the controller to assign a channel to the theatre device operated in the activating step.

31. A method as in claim 29 further comprising repeating the selecting and operating steps for all of the theatre devices in the hierarchy prior to the normal mode key entering step.

32. A method as in claim 29 wherein the auxiliary mode key code is a channel assignment mode key code and the auxiliary mode is a channel assignment mode.

33. A method as in claim 29 wherein the auxiliary mode key code is a setup mode key code and the auxiliary mode is a setup mode.

34. A method as in claim 29 wherein the auxiliary mode key code is a service mode key code and the auxiliary mode is a service mode.

35. A method as in claim 29 wherein the auxiliary mode key code entering step comprises:
setting all outputs of the controller at about respective default values;
bringing a predetermined one of the channels of the controller to about a predetermined level within about a first minimum time and about a first maximum time following the setting step; and
returning the predetermined one of the channels of the controller to about the default level within about a second minimum time and about a second maximum time following the bringing step.

36. In a theatre system having a normal mode of operation that uses a unidirectional continuous data stream from a controller to a group of theatre devices over a communications link for remote control thereof during theatre events, wherein the group of theatre devices comprises a plurality of theatre devices capable of a bi-directional communications, a method of channel assignment comprising:
establishing respective positions in a hierarchy for the bi-directional theatre devices in the absence of the continuous data stream;
applying the unidirectional continuous data stream to the theatre devices in the hierarchy from the controller over the communications link;
broadcasting a first instruction on the communications link from the controller to place the theatre devices in the hierarchy in a channel assignment mode of operation;
broadcasting a second instruction on the communications link from the controller using the unidirectional continuous data stream to evoke a response from at least one of the theatre devices in the hierarchy;
operating at least one of the theatre devices in response to the second instruction in accordance with the position thereof in the hierarchy and in a manner that is observable to a human observer;
assigning a channel to the theatre device operated in the operating step using the unidirectional continuous data stream;
repeating the second instruction broadcasting step, the operating step, and the assigning step at least once; and
broadcasting a third instruction on the communications link from the controller using the unidirectional continuous data to place the theatre system in the normal mode of operation.

37. A method as in claim 36 wherein the bi-directional theatre devices include respective identifying information and wherein the hierarchy establishing step comprises:
establishing at least one of the bi-directional theatre devices as a master theatre device and a plurality of the bi-directional theatre devices as slave theatre devices;
acquiring in the master theatre device the identifying information of the slave theatre devices; and
determining the hierarchy using the identified information of the slave theatre devices from the acquiring step and the identifying information of the master.

38. A method as in claim 37 wherein the identifying information is a unique code for each of the bi-directional theatre devices established at time of manufacture thereof.

39. A method as in claim 36 wherein the bi-directional theatre devices include respective identifying information and wherein the hierarchy establishing step comprises:
furnishing the identifying information from each of the bi-directional theatre devices to others of the bi-directional theatre devices;
establishing in the bi-directional theatre devices substantially identically ordered lists of the identifying information for the bi-directional theatre devices; and
comparing in each of the bi-directional theatre devices the identifying information thereof with the ordered list established therein to determine a position thereof in the list.

40. A method as in claim 39 wherein the identifying information is a unique code for each of the bi-directional theatre devices established at time of manufacture thereof.

41. A method as in claim 36 wherein the hierarchy establishing step comprises:
arbitrating among the bi-directional theatre devices having no position in the hierarchy to grant control of the communications link to one of the bi-directional theatre devices;
assigning to the bi-directional theatre device granted control in the arbitrating step an unassigned position in the hierarchy; and
repeating the arbitrating and assigning steps until all of the bi-directional theatre devices have respective positions in the hierarchy.

42. A method as in claim 36 wherein the first instruction broadcasting step comprises entering a key code at the controller.

43. A method as in claim 42 wherein the key code entering step comprises:
setting all outputs of the controller at about respective default values;
bringing a predetermined one of the channels of the controller to about a predetermined level within about a first minimum time and about a first maximum time following the setting step; and
returning the predetermined one of the channels of the controller to about the default level within about a second minimum time and about a second maximum time following the bringing step.

44. A method as in claim 43 wherein:
the default values are zero;
the predetermined one of the channels is the first channel;
the predetermined level is about 25;

the first minimum time is about 10 seconds and the first maximum time is about 30 seconds; and the second minimum time is about 2 seconds and the second maximum time is about 5 seconds.

45. A method as in claim 36 wherein:

the controller comprises a plurality of channel controls;

the second instruction broadcasting step comprises advancing a predetermined one of the channel controls to about a predetermined level; and the channel assigning step comprises advancing a selected one of the channel controls to about a predetermined level.

46. A method as in claim 36 wherein the repeating step comprises repeating the second instruction broadcasting step, the operating step, and the selecting step for all of the theatre devices in the hierarchy prior to the third instruction broadcasting step.

47. A method as in claim 36 wherein the third instruction broadcasting step comprises entering a key code at the controller.

48. In a theatre system having a normal mode of operation that uses a unidirectional continuous digital data stream to communicate from a controller to a group of theatre devices having different channel addresses over a communications link for control thereof during theatre events, and wherein the controller comprises a plurality of channels, a method to access the theatre devices in the group comprising:

establishing in the unidirectional continuous digital data stream a predetermined bit pattern reflecting a particular setting of at least one of the controller channels; and evoking a response to the establishing step by each of the theatre devices of the group.

49. A method as in claim 48 wherein the evoking step comprises setting the theatre devices of the group into an alternative mode of operation in response to the establishing step.

50. A method as in claim 49 wherein the alternative mode of operation is a setup mode.

51. A method as in claim 49 wherein the alternative mode of operation is a service mode.

52. A method as in claim 48 wherein the establishing step comprises setting at least one of the channels of the controller at about a predetermined level for about a predetermined period of time.

53. A method as in claim 48 wherein the establishing step comprises setting a plurality one of the channels of the controller at about respective predetermined levels for about a predetermined period of time.

54. A method as in claim 48 wherein the establishing step comprises:

setting all channels of the controller at respective default values;

setting a predetermined one of the channels of the controller to about a predetermined level within about a first minimum time and about a first maximum time following the setting step; and returning the predetermined one of the channels of the controller to the default level within about a second minimum time and about a second maximum time following the predetermined channel setting step.

55. A method as in claim 54 wherein:

the default values are zero;

the predetermined one of the channels is the first channel;

the predetermined level is about 25;

the first minimum time is about 10 seconds and the first maximum time is about 30 seconds; and the second minimum time is about 2 seconds and the second maximum time is about 5 seconds.

56. A microprocessor-controlled theatre device having first identifiers and capable of bi-directional communications for use in a theatre system having a controller for furnishing a unidirectional continuous data stream to a group of theatre devices over a communications link for remote control thereof during theatre events, wherein the group of theatre devices comprises a plurality of other microprocessor-controlled theatre devices having respective second identifiers and capable of a bi-directional communications, comprising:

means for selecting between master and slave status during bi-directional communication with the other bi-directional theatre devices in the absence of the unidirectional continuous data stream;

means for acquiring the second identifiers from the other bi-directional theatre devices over the communications link when having the master status in the absence of the unidirectional continuous data stream;

means for broadcasting the first identifier over the communications link when having the slave status in the absence of the unidirectional continuous data stream; and means for determining the hierarchy using the second identifiers acquired in the acquiring step and the first identifier.

57. An apparatus as in claim 56 wherein the unidirectional continuous data stream is compliant with a DMX512 protocol.

58. A microprocessor-controlled theatre device capable of bi-directional communications for use in a theatre system having a controller for furnishing a unidirectional continuous data stream to a group of theatre devices over a communications link for remote control thereof during theatre events, wherein the group of theatre devices comprises a plurality of other microprocessor-controlled theatre devices capable of a bi-directional communications, comprising:

means for arbitrating for control of the communications link during bi-directional communication with the other bi-directional theatre devices in the absence of the unidirectional continuous data stream;

means for maintaining a count of arbitrations lost; and means for assigning a position in a hierarchy based on the count of arbitrations lost when an arbitration is won.

59. An apparatus as in claim 58 wherein the unidirectional continuous data stream is compliant with a DMX512 protocol.

60. In a theatre system that comprises a plurality of theatre devices having respective identifying information and that is compliant with a DMX protocol for control of the theatre devices during a theatre event, a method of identifying the theater devices for performing operations thereon, comprising:

generating a list of the identifying information of the theater devices;

instructing one of the theatre devices using the identifying information thereof from one position on the list, to operate in a manner that is observable to a human observer;

operating the instructed theatre device in a manner that is observable to a human observer; and repeating the instructing and operating steps using identifying information from another position on the list, wherein at least some of the theater devices are identified to a human observer for performing operations thereon.

61. A method as in claim 60 further comprising performing an operation on at least one of the theatre devices identified to a human observer.

62. A method as in claim 60 further comprising performing a channel assignment operation on each of the theatre devices identified to a human observer.

63. A method as in claim 61 wherein at least some of the theatre devices identified to a human observer have a setup operation performed thereon.

64. A method as in claim 63 wherein the setup operation is a channel assignment operation.

65. A method as in claim 61 wherein the performing step comprises performing an auxiliary operation on each of the theatre devices identified to a human observer, the auxiliary operation being selected from a group consisting of setup operations and service operations.

66. A method as in claim 61 wherein the performing step comprises performing a channel assignment operation on at least one of the theatre devices identified to a human observer.

67. A method as in claim 61 wherein the performing step comprises performing a parameter adjustment operation on at least one of the theatre devices identified to a human observer.

68. A method as in claim 61 wherein the performing step comprises performing a quiet mode setup operation on at least one of the theatre devices identified to a human observer.

69. A method as in claim 61 wherein the performing step comprises performing a reduced capacity setup operation on at least one of the theatre devices identified to a human observer.

70. A method as in claim 61 wherein the performing step comprises performing a high speed setup operation on at least one of the theatre devices identified to a human observer.

71. A method as in claim 61 wherein the performing step comprises performing a testing operation on at least one of the theatre devices identified to a human observer.

72. A method as in claim 61 wherein the performing step comprises performing an observer observable self test sequence on at least one of the theatre devices identified to a human observer.

73. A method as in claim 61 wherein the performing step comprises performing a software updating operation on at least one of the theatre devices identified to a human observer.

74. A method as in claim 61 wherein the performing step comprises performing a maintenance operation on at least one of the theatre devices identified to a human observer.

75. A method as in claim 60 wherein at least some of the theatre devices are multiparameter having respective device identification numbers, the identifying information of the multiparameter lights being the device identification numbers.

76. A method as in claim 75 wherein the multiparameter lights are capable of bi-directional communications over a communications link and the list generating step comprises arbitrarily establishing respective positions of the multiparameter lights on the list.

77. A method as in claim 75 wherein the multiparameter lights are capable of bi-directional communications over a communications link and the list generating step comprises establishing respective positions of the multiparameter lights on the list based on successive arbitrations for control of the communications link by the multiparameter lights.

78. A method as in claim 75 wherein the multiparameter lights are capable of bi-directional communications over a communications link, and wherein:

the instructing step comprises placing a selector signal on the communications link; and the operating step comprises operating only one of the multiparameter lights in response to the selector signal.

79. A method as in claim 75 wherein the multiparameter lights are capable of bi-directional communications over a communications link, and wherein:

the instructing step comprises placing a response sequence initiation instruction on the communications link; and the operating step comprises operating a succession of the theatre devices in response to the response sequence initiation instruction.

80. A method as in claim 60 wherein:

at least one of the instructed theatre devices is a multiparameter light; and the operating step comprises changing a parameter of the multiparameter light.

81. A method as in claim 68 wherein the parameter is light intensity.

82. A method as in claim 68 wherein the parameter is tilt.

83. A method as in claim 68 wherein the parameter is pan.

84. A method as in claim 68 wherein the parameter is shutter.

85. A method as in claim 68 wherein the parameter is color.

86. A method as in claim 60 wherein:

at least one of the instructed theatre device produces a wind theatre effect; and the operating step comprises producing the wind theatre effect.

87. A method as in claim 60 wherein:

at least one of the instructed theatre device produces a sound theatre effect; and the operating step comprises producing the sound theatre effect.

88. A method as in claim 60 wherein:

at least one of the instructed theatre device produces a movement theatre effect; and the operating step comprises producing the movement theatre effect.

89. A method as in claim 60 wherein:

at least one of the instructed theatre device produces a light theatre effect; and the operating step comprises producing the light theatre effect.

90. A method as in claim 60 wherein the human observer is an operator of the theatre system.

* * * * *